(12) United States Patent
Fantinel et al.

(10) Patent No.: US 8,569,434 B2
(45) Date of Patent: Oct. 29, 2013

(54) ETHYLENE COPOLYMERS, CATALYST SYSTEM AND PROCESS FOR PREPARING THE SAME

(75) Inventors: Fabiana Fantinel, Frankfurt (DE); Shahram Mihan, Bad Soden (DE); Volker Dolle, Bensheim (DE); Andreas Maus, Frankfurt (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 13/148,041

(22) PCT Filed: Feb. 16, 2010

(86) PCT No.: PCT/EP2010/000938
§ 371 (c)(1),
(2), (4) Date: Aug. 30, 2011

(87) PCT Pub. No.: WO2010/094450
PCT Pub. Date: Aug. 26, 2010

(65) Prior Publication Data
US 2011/0313111 A1 Dec. 22, 2011

Related U.S. Application Data

(60) Provisional application No. 61/209,518, filed on Mar. 6, 2009.

(30) Foreign Application Priority Data

Feb. 20, 2009 (EP) .................................... 09002374

(51) Int. Cl.
*C08L 23/08* (2006.01)
(52) U.S. Cl.
USPC ........................................................ 526/240

(58) Field of Classification Search
USPC ........... 525/240; 526/113, 114, 160, 348, 943
See application file for complete search history.

(56) References Cited

U.S. PATENT DOCUMENTS 5,272,236 A 12/1993 Lai
5,427,807 A 6/1995 Chum et al.

FOREIGN PATENT DOCUMENTS

| EP | 0735059 | 10/1996 |
|---|---|---|
| WO | WO-9308221 | 4/1993 |
| WO | WO-9704015 | 7/1996 |
| WO | WO-0112641 | 2/2001 |
| WO | WO-0112687 | 2/2001 |
| WO | WO-03008468 | 1/2003 |
| WO | WO-2004056878 | 7/2004 |
| WO | WO-2005103100 | 11/2005 |
| WO | WO-2006063826 | 6/2006 |
| WO | WO-2006114210 | 11/2006 |
| WO | WO-2007111499 | 10/2007 |

OTHER PUBLICATIONS

Grubisic, Z. et al., "A Universal Calibration for Gel Permeation Chromatography", Polymer Letters vol. 5 1967, pp. 753-759.
Pasch, Harald et al., "Analysis of Polyolefin blends by crystallization analysis fractionation", Marcomol. Mater. Eng. 279 2000, 46-51.

*Primary Examiner* — Caixia Lu

(57) ABSTRACT

An ethylene copolymer, a catalyst system suitable to prepare the ethylene copolymer, and a process to prepare such ethylene copolymer are described. The use of the ethylene copolymer as impact modifier in polyethylene and as compatibilizer in a polymer blend are also described. The ethylene copolymer has a density from 0.855 g/cm³ to 0.910 g/cm³, a polydispersity $M_w/M_n$ lower than 3.5, comprises at least one first ethylene polymer component and at least one second ethylene polymer component having different comonomer contents so as to show at least two predetermined CRYSTAF peak temperatures.

5 Claims, No Drawings

ETHYLENE COPOLYMERS, CATALYST SYSTEM AND PROCESS FOR PREPARING THE SAME

This application is the U.S. national phase of International Application PCT/EP2010/000938, filed Feb. 16, 2010, claiming priority to European Patent Application 09002374.8 filed Feb. 20, 2009, and the benefit under 35 U.S.C. 119(e) of U.S. Provisional Application No. 61/209,518, filed Mar. 6, 2009; the disclosures of International Application PCT/EP2010/000938, European Patent Application 09002374.8 and U.S. Provisional Application No. 61/209,518, each as filed, are incorporated herein by reference.

FIELD OF THE INVENTION

The present invention relates to ethylene copolymers, in particular copolymers of ethylene with at least one alpha-olefin comonomer, to a catalyst system and to a process suitable to prepare such ethylene copolymers. More in particular, the present invention relates to elastomeric ethylene copolymers.

In the present description and in the following claims the term "catalyst system" is used to indicate a system comprising at least one catalyst component, i.e. at least one metal component catalyzing the olefin polymerization reaction, and, optionally, further components, such as for example an agent activating the catalyst component (also known as cocatalyst or activator), a support and any other component.

The present invention relates also to a composition comprising an ethylene copolymer of the above-mentioned type and to the use thereof as impact modifier and compatibilizer in a blend, as well as for producing films and membranes and analogous articles.

In the present description and in the following claims, the expression "elastomeric ethylene copolymer" is intended to indicate a copolymer of ethylene and at least one further comonomer having a melting enthalpy ($\Delta Hf$) lower than 40 J/g, preferably lower than 30 J/g, wherein the melting enthalpy is measured by means of the DSC technique as described in more detail in the detailed description of preferred embodiments of the invention.

In the present description and in the following claims, unless otherwise indicated, the term "polymer" is used to indicate both a homopolymer, i.e. a polymer comprising repeating monomeric units derived from equal species of monomers, and a copolymer, i.e. a polymer comprising repeating monomeric units derived from at least two different species of monomers, in which case reference will be made to a binary copolymer, to a terpolymer, etc. depending on the number of different species of monomers present.

In an analogous manner, unless otherwise specified, in the present description and in the following claims, the term "polyethylene" is used to indicate both an ethylene homopolymer and a copolymer of ethylene and at least a further comonomer.

PRIOR ART

Copolymers of ethylene with further monomers are a substantial part of the olefin polymer production. Although the bulk of ethylene polymers are thermoplastics, there is a growing need for elastomeric thermoplastic olefin polymers. Copolymers of ethylene with higher olefin monomers, namely $C_4$ or higher, are well known and used in the art. Among these there is linear low density polyethylene, which is conventionally produced as copolymer of ethylene with 1-butene or 1-octene using traditional Ziegler-Natta catalyst systems. These copolymers typically have a broad molecular weight distribution and a broad composition distribution.

Some of the ethylene-$C_4$ copolymers or of copolymers of ethylene with higher monomers have a particularly range of application as elastomers. There are generally three families of elastomers made from such copolymers.

A first class is typified by ethylene-propylene copolymers (EPR) which are saturated compounds, of low crystallinity, requiring vulcanization with free-radical generators to achieve adequate elastic properties.

A second class of elastomers is typified by ethylene-propylene terpolymers (EPDM), again of low crystallinity, which contain a small amount of a non-conjugated diene such as ethylidene norbornene. The residual unsaturation provided by the diene termonomer allows for vulcanization with sulfur, which then yields excellent elastomeric properties.

Yet a third class is typified by ethylene-alpha olefin copolymers of narrow composition distribution which possess elastomeric properties even in the absence of vulcanization. Prior art copolymers of this type can be prepared by metallocene catalyst systems. PCT patent application WO93/08221 describes a class of substantially linear polyolefin copolymer elastomers with narrow composition distribution. These are produced with constrained geometry catalyst systems, as for example described in documents U.S. Pat. Nos. 5,272,236 and 5,427,807, and have narrow molecular weight distribution, narrow composition distributions and melting point ranges corresponding to random copolymers.

Representatives of these known copolymers having a narrow composition distribution are ethylene/1-butene copolymers sold as Exact™ by Exxon Chemical, ethylene/1-octene copolymers sold as Engage™ by Dow Chemical and ethylene/1-octene copolymers sold as TAFMER™ by Mitsui Petrochemical Industries, Ltd.

One of the main disadvantages of this third class of elastomers is the difficulty thereof to be processed due to lack of crystallinity and, in particular, due to stickiness both in the production process and in the subsequent pelletization process.

In the attempt of overcoming this disadvantage, olefin compositions have been developed made by blending a propylene copolymer with a crystalline homopolymer, for example polypropylene. However, the blending is an undesirable further step in the production process following the polymerization step of the copolymer.

EP-A2-0 735 059 describes a broad group of ethylene alpha -olefin copolymers having a relatively broad composition distribution and a narrow molecular weight distribution.

WO03/008468 describes a process for polymerizing olefin(s) to produce a polymer product, the process comprising a contacting ethylene and at least one comonomer with a catalyst system, wherein the catalyst system comprises a poor comonomer incorporating catalyst compound having at least one fused ring cyclopentadienyl based ligand and a good comonomer incorporating catalyst compound, and wherein the polymer product has a bimodal composition distribution.

The composition distribution of the copolymers of these prior art documents is not sufficiently broad to give rise to the desired elastomeric properties. More particularly, the balance between impact strength and stiffness is inadequate.

SUMMARY OF THE INVENTION

In view of the above, the Applicant has perceived the need of providing, within the group of ethylene copolymers having a narrow, preferably monomodal, molecular distribution, copolymers having an improved processability, in particular in the sense of attaining an improved balance between low temperature impact and stiffness without impairing the elastic module and of overcoming the undesirable stickiness problems involved both in the polymerization process carried out in the reactor and in the pelletization process carried out downstream of the reactor.

In the present description and in the following claims, a molecular distribution of a polymer shall be considered narrow if the polydispersity $M_w/M_n$ is lower than 3.5, preferably lower than 3.

In the present description and in the following claims, the molecular distribution of a polymer shall be considered monomodal if the curve of the molecular weight distribution determined by GPC has a single peak.

Accordingly, an object may be said that of providing an ethylene copolymer having a narrow, preferably monomodal, molecular weight distribution, which, although having a high content of comonomer, preferably in the range from 15% to 40% by weight, and thus a substantially amorphous nature, does not give rise to the stickiness problems evidenced by the prior art olefin elastomers.

The Applicant has surprisingly found that this problem is solved by a copolymer having a composition distribution which is at least bimodal, namely comprising a first polymer incorporating more comonomer (more amorphous component) and a second polymer incorporating less comonomer (less amorphous component), in which the first polymer has a predetermined degree of cristallinity.

The Applicant has surprisingly found that an ethylene copolymer showing at least two CRYSTAF peak temperatures, namely at least one first CRYSTAF peak temperature and at least one second CRYSTAF peak temperature lower than said first CRYSTAF peak temperature, wherein the first CRYSTAF peak temperature is lower than a predetermined temperature and the second CRYSTAF peak temperature is higher than a predetermined temperature, is advantageously better processable with respect to the ethylene copolymers of the prior art.

More particularly, according to a first aspect thereof, the present invention provides an ethylene copolymer having the features defined in attached claim 1.

In other words, the copolymer comprises at least one first ethylene polymer having a first comonomer content and at least one second ethylene polymer having a second comonomer content lower than the first comonomer content. The comonomer is distributed in the at least two ethylene polymers in such a manner that the copolymer shows at least two predetermined CRYSTAF peak temperatures, namely a first CRYSTAF peak temperature lower than 30° C. and a second CRYSTAF peak temperature at least 20° C. higher than the first peak temperature.

Advantageously, on the one side, thanks to the presence of a predetermined degree of cristallinity in the more amorphous polymer of the copolymer, the copolymer of the invention is better processable both during the polymerization process in the reactor and in the subsequent pelletization process with respect to the prior art ethylene copolymers.

The cristallinity can be expressed in terms of melting enthalpy $\Delta Hf$ as determined by DSC analysis. Preferably, the melting enthalpy of the copolymer is lower than 40 J/g, more preferably lower than 36 J/g. Preferably, the melting enthalpy of the copolymer is comprised between 15 J/g and 35 J/g. More preferably, the melting enthalpy of the copolymer is comprised between 15 J/g and 30 J/g.

On the other side, thanks to the polymer richer in comonomer, the copolymers of the invention have a low glass transition temperature (Tg), preferably from −30° C. to −60° C., more preferably from −40° C. to −50° C., which, in turn, advantageously allows to obtain the desired balance between low temperature impact and stiffness without impairing the elastic modulus.

Furthermore, thanks to the narrow molecular weight distribution, preferably a monomodal molecular weight distribution, an improved miscibility is ensured because the at least two polymers are compatible to each other and homogeneously better mixable.

This is in turn results in an ethylene copolymer exhibiting improved mechanical properties, in particular in terms of balance of loss modulus and low temperature impact.

The copolymer of the invention preferably comprises from 60 to 85% by weight of ethylene and from 15% to 40% by weight of the at least one alpha-olefin comonomer, depending on the type of the comonomer. More preferably, the copolymer comprises from 70 to 80% by weight of ethylene and from 20 to 30% by weight of the at least one alpha-olefin comonomer. Still more preferably, the copolymer comprises from 72 to 78% by weight of ethylene and from 22 to 28% by weight of the at least one alpha-olefin comonomer.

The comonomer is an alpha-olefin, more preferably an alpha-olefin with 3-12 carbon atoms, still more preferably an alpha-olefin with 4-10 carbon atoms.

Preferably, the alpha-olefin comonomer is selected from the group comprising, more preferably consisting of, 1-butene, 1-hexene, 4-methyl-1-pentene, 1-octene, 1-decene.

Preferably, the alpha-olefin comonomer is 1-hexene.

According to a preferred embodiment, the copolymer is a copolymer of ethylene and of a first alpha comonomer and of a second alpha-olefin comonomer. In other words, the copolymer is preferably a terpolymer.

The density of the ethylene copolymers of the present invention, as measured in accordance with standard DIN EN ISO 1183-1, variant A, is generally in the range of elastomers, i.e. from 0.855 g/cm³ to 0.910 g/cm³, depending on the type of alpha-olefin comonomer, preferably from 0.860 to 0.905 g/cm³, more preferably from 0.860 to 0.888 g/cm³. At densities above 0.910 g/cm³, ethylene copolymers are generally not elastomeric any longer.

The copolymer has a narrow molecular weight distribution according to the definition given above. Accordingly, the polydispersity $M_w/M_n$ of the copolymer is lower than 3.5. Preferably, the copolymer has a monomodal molecular weight distribution. Accordingly, the curve of the molecular weight distribution determined by GPC has preferably a single peak.

Preferably, the polydispersity $M_w/M_n$ of the copolymer is lower than 3, more preferably from 2 to 3.

A copolymer having the above-mentioned values of polydispersity and still comprising at least two polymers differing in comonomer content may be prepared by a catalyst system comprising, for example, a first catalyst component and a second catalyst component, preferably including respective chromium single site catalysts. Such a copolymer may be for example prepared by means of the catalyst system described below with reference to a further aspect of the invention.

Preferably, the polydispersity $M_w/M_n$ of the each of the at least two polymers is lower than 3.5, more preferably lower than 3 and, still more preferably, from 2 to 3, more preferably from 2.2 to 3.0.

Each of the at least two ethylene polymers preferably has substantially the same $M_w/M_n$, preferably lower than 3.5, more preferably lower than 3 and, still more preferably, from 2 to 3, thus advantageously giving rise to a copolymer having a narrow molecular weight distribution.

Advantageously, the at least two ethylene polymers are compatible and homogeneously mixable with each other in the molten state, thus leading to improved mechanical properties, especially in terms of loss modulus and low temperature impact.

Preferably, the copolymer comprises from 10 to 90% by weight of the first polymer incorporating more comonomer. Preferably, the copolymer comprises from 20 to 80%, more preferably from 30 to 70%, more preferably from 40 to 60% by weight of the first polymer incorporating more comonomer.

The intrinsic viscosity of the copolymer is preferably higher than 0.5 dl/g, preferably from 0.5 to 3.5 dl/g, more preferably from 0.7 to 1.4 dl/g.

The MFR(190/2.16) of the copolymer is preferably from 0.5 to 50 g/10 min, more preferably from 1 to 40 g/10 min and, more preferably from 10 to 25 g/10, still more preferably from 12 to 20 g/10 min.

In the present description and in the following claims, the melt flow rate MFR(190/2.16) is the melt flow rate as determined according to standard ISO 1133 at a temperature of 190° C. and under a weight of 2.16 kg.

The ethylene copolymer shows at least two CRYSTAF peak temperatures, thus meaning that the ethylene copolymer is multimodal, i.e. at least bimodal, in terms of composition distribution. This means that the copolymer comprises one ethylene polymer with relatively higher comonomer content, and one ethylene polymer with relatively lower comonomer content.

In the present description and in the following claims, the term CRYSTAF refers to an analytical method known to those of ordinary skill in the art, namely to the crystallization analysis fractionation and the expression CRYSTAF peak temperature refers to the peak temperature of the curve obtained by means such method. More particularly, through this technique the chemical composition distribution and the distribution of short chain branches are determined.

This technique involves dissolving a sample in a solvent at high temperature, then cooling the solution slowly to cause fractionation of the sample based on solubility. For semicrystalline samples, including blends, solubility depends primarily on crystallizability: portions of the sample that are more crystalline will precipitate out of solution at a higher temperature than portions of the sample that are less crystalline.

As known, the relative amount of sample in solution as a function of temperature is measured using an infrared (IR) detector to obtain the cumulative solubility distribution. The soluble fraction (SF) is defined as the IR signal at the lowest temperature (at 0° C.) divided by the IR signal when all the sample is dissolved at high temperature, and corresponds to the weight fraction of sample that has not crystallized.

A commercial CRYSTAF 200 instrument (Polymer Char S. A., Valencia, Spain) with five stirred stainless steel vessels of 60 ml volume was used to perform this test method. The technique used is outlined in Harald Pasch*, Robert Brüll[2], Udo Wahner[2] Benjamin Monrabal[3] MACROMOL. MATER. ENG. 279, 46-51 (2000).

Differently to the procedure given in the literature, approximately 15 mg of sample were dissolved for 60 min at 160° C. in 30 ml of 1,2-dichlorobenzene. The solution was then stabilized for 90 min at 95° C.

The crystallization was carried out from 95 to 30° C. at a crystallization rate of 0.1° C./min. In the given examples the final temperature reached was 0° C.

A dual wavelength infrared detector with a heated flow through cell maintained at 150° C. was used to measure the polymer concentration in solution at regular intervals during the crystallization cycle; the measuring wavelength was 3.5 μm and the reference wavelength was 3.6 μm. The cumulative soluble concentration was measured as the polymer crystallized while the temperature was decreased. The analytical derivative of the cumulative profile reflected the short chain branching distribution of the polymer.

The CRYSTAF peak temperatures and areas were identified by the peak analysis module included in the CRYSTAF Software (Version 200 Lb PolymerChar, Valencia, Spain). The CRYSTAF peak finding routine identifies a peak temperature as a maximum in the dW/dT and the area between the largest positive inflections on either side of the identified peak in the derivative curve.

The temperature difference between the first CRYSTAF peak and the second CRYSTAF peak is referred to as the "spread". According to the invention, the first CRYSTAF peak temperature is lower than 30° C., and the spread between the apex of the first CRYSTAF peak and the apex of the second CRYSTAF peak is of at least 20° C.

More preferably, the difference between the first CRYSTAF peak temperature and the second CRYSTAF peak temperature is preferably greater than 25° C., more preferably greater than 30° C., still more preferably, greater than 35° C., still more preferably greater than 40° C., still more preferably greater than 50° C. Preferably, the difference between the first CRYSTAF peak temperature and the second CRYSTAF peak temperature is smaller than 70° C., more preferably smaller than 65° C.

According to a preferred embodiment, the first CRYSTAF peak temperature is in the range from 0° C. to 30° C., more preferably from 2° C. to 25° C. and, still more preferably, from 3° C. to 20° C.

According to a preferred embodiment, the second CRYSTAF peak temperature is higher than 50° C., preferably from 55° C. to 75° C., more preferably from 60° C. to 70° C.

According to a preferred embodiment, the area between the largest positive inflections on either side of the first CRYSTAF peak temperature is greater than 10%, preferably greater than 15%, more preferably greater than 20%.

Ethylene copolymers of the type described above are particularly suitable to be used as impact modifiers with the aim of increasing the impact performances both at room and low temperature of homopolymers.

Furthermore, ethylene copolymers of the type described above are also suitable to be used as compatibilizers in polymer blends with the aim of enhancing the miscibility of the single components of the polymer blends.

The above-mentioned copolymers may also be used to prepare films having reduced seal temperature and membranes.

Accordingly, the present invention provides also a composition comprising an elastomeric ethylene copolymer as defined above and an ethylene homopolymer.

Preferably, the composition comprises less than 40% by weight of ethylene homopolymer, preferably less than 20% by weight of ethylene homopolymer, preferably less than 15% by weight of homopolymer.

Preferably, the ethylene homopolymer has a density of from 0.940 to 0.965 g/cm$^3$, more preferably from 0.950 to 0.960 g/cm$^3$ and, still more preferably, from 0.952 to 0.958 g/cm$^3$.

Preferably, the ethylene homopolymer has a MFR(190/2.16) of from 0.5 to 50 g/10 min, more preferably from 1 to 40 g/10 min and, still more preferably, from 2 to 30 g/10 min.

The present invention provides a composition comprising an elastomeric ethylene copolymer as defined above and a polymer, preferably comprising a propylene polymer.

Preferably, the composition comprises from 5 to 45% by weight of elastomeric ethylene copolymer and from 55 to 95% by weight of propylene polymer.

According to a further aspect thereof, the present invention provides a catalyst system for polymerizing ethylene with at least one alpha-olefin comonomer as defined by attached claim 7.

Preferably, the first catalyst component and the second catalyst components are such that each of the polymers prepared therefrom has substantially the same polydispersity, preferably lower than 3.5.

The first catalyst component incorporates a first amount of comonomer and the second catalyst component incorporates a second amount of comonomer: the first amount of comonomer is preferably less than 2% mol, more preferably less than 1.5% mol, more preferably less than 1.0% mol, while the second amount of comonomer is preferably at least 2% mol, more preferably from 2 to 12% mol, more preferably at least 4% mol, more preferably from 4 to 12% mol, more preferably from 6 to 12%.

Advantageously, on the one side, thanks to the fact that the catalyst components belong to the same class of catalysts, the catalyst system allows to perform respective polymerizations having similar mechanism and similar response to process conditions, in particular similar response to the molar mass regulator (for example hydrogen). Thus, the polymers obtained therefrom are compatible to each other and have improved miscibility with each other.

On the other side, thanks to the fact that the catalyst components incorporate different amounts of comonomer, it is advantageously possible to obtain respective polymers containing different amount of comonomer. In this way, it is advantageously possible to tailor the amorphous and, respectively, the crystalline part in the final ethylene copolymer.

In the formula (I), $R^2$ is preferably phenyl, preferably either unsubstituted or substituted in position 3. If substituted, this phenyl is preferably substituted with —$CF_3$.

In the formula (I), preferably v=0, $R^6$ and $R^7$ are preferably joined to form a six-membered ring and $R^1$ is preferably methyl.

In the formula (I), preferably v=1, $R^5$ and $R^6$ are preferably methyl, $R^7$ is preferably hydrogen.

In the formula (II), L is preferably C, $R^2$ is preferably hydrogen, $R^3$ is preferably hydrogen, $R^1$ is preferably $SiR^8_3$, more preferably $Si(CH_3)_3$.

In each of the two formulae (I) and (II), X is preferably chlorine.

The above-mentioned two catalyst components can be used alone or together with further components as catalyst system for olefin copolymerization. Accordingly, the catalyst system may comprise, in addition to the at least two complexes as defined above, optionally an organic or inorganic support, optionally one or more activating compounds, optionally further catalyst components belonging to different classes of catalysts, and optionally one or more metal compounds containing a metal of group 1, 2 or 13 of the Periodic Table.

Preferred further components of the catalyst system in addition to the at least one first catalyst component and the at least one second catalyst component are for example those described in WO2006/063826, namely from page 16, line 4 to page 24, line 34.

Thus, the optional one or more catalysts D) of WO2006/063826 are to be intended, according to the wording of the present application, as optional further catalyst components which may be provided in addition to the at least one first catalyst component and the at least one second catalyst component.

According to a preferred embodiment, the molar ratio between the two catalyst components is 0.1:10, more preferably 0.5:5, more preferably 2:4, more preferably 1:1.

The present invention further provides the use of a catalyst system as defined above for polymerizing ethylene with at least one alpha-olefin comonomer.

The present invention further provides a process for preparing a copolymer of ethylene with at least one further alpha-olefin comonomer, comprising the steps of:
a) providing the catalyst system as defined above;
b) subjecting ethylene and said alpha-olefin comonomer to polymerization in the presence of said catalyst system so as to obtain a copolymer as defined above.

In other words, the process comprises the steps of:
subjecting ethylene and said at least one further alpha-olefin comonomer to at least one first polymerization stage in the presence of said at least one first catalyst component so as to obtain a respective at least one first ethylene polymer having a first comonomer content;
subjecting ethylene and said at least one further alpha-olefin comonomer to at least one second polymerization stage in the presence of said at least one second catalyst component so as to obtain a respective at least one second ethylene polymer having a second comonomer content;
wherein said two steps are carried out in a parallel manner in a single reactor.

The polymerization can be carried out in a known manner in bulk, in suspension, in the gas phase or in a supercritical medium in the customary reactors used for the polymerization of olefins. The polymerization can be carried out batchwise or, preferably, continuously in one or more stages. High-pressure polymerization processes in tube reactors or autoclaves, solution processes, suspension processes, stirred gas-phase processes or gas-phase fluidized-bed processes are all possible. Solution polymerization processes are particularly preferred.

The polymerization is usually carried out at from 60 to 350° C. under pressures of from 0.5 to 4 000 bar at mean residence times of from 0.5 to 5 hours, preferably from 0.5 to 3 hours. The advantageous pressure and temperature ranges for carrying out the polymerization usually depend on the polymerization method. In the case of high-pressure polymerization processes, which are usually carried out at pressures of from 1000 to 4000 bar, in particular from 2 000 to 3500 bar, high polymerization temperatures are generally also set. Advantageous temperature ranges for these high-pressure polymerization processes are from 200 to 320° C., in particular from 220 to 290° C. In the case of low-pressure polymerization processes, a temperature which is at least a few degrees below the softening temperature of the polymer is generally set. These polymerization processes are preferably carried out at from 50 to 180° C., preferably from 70 to 120° C. In the case of suspension polymerization, the polymerization is usually carried out in a suspension medium, preferably an inert hydrocarbon such as isobutane or a mixture of hydrocarbons, or else in the monomers themselves. The polymerization temperatures are generally in the range from 20 to 115° C., and the pressure is generally in the range from 1 to 100 bar. The solids content of the suspension is generally in the range from 10 to 80%. The polymerization can be carried out batchwise, e.g. in stirring autoclaves, or continuously, e.g. in tube reactors, preferably in loop reactors.

Particular preference is given to the Phillips process. The gas-phase polymerization is generally carried out at from 30 to 125° C.

Among the above-mentioned polymerization processes, particular preference is given to gas-phase polymerization, in particular in gas-phase fluidized-bed reactors, solution polymerization and suspension polymerization, in particular in loop reactors and stirred tank reactors. The gas-phase polymerization can also be carried out in the condensed or supercondensed phase, in which part of the circulating gas is cooled to below the dew point and is recirculated as a two-phase mixture to the reactor. It is also possible to use a multizone reactor in which two polymerization zones are linked to one another and the polymer is passed alternately through these two zones a number of times. The two zones can also have different polymerization conditions. Such a reactor is described, for example, in WO 97/04015. Different or identical subsequent polymerization stages can also, if desired, be provided, for example in two or three reactors arranged in series so as to form a polymerization cascade. A parallel reactor arrangement using two or more identical or different processes is also possible. Furthermore, molar mass regulators, for example hydrogen, or customary additives such as antistatic agents can also be used in the polymerization.

It is also possible to use any one of the above-mentioned first and second catalyst components—either alone or in combination—with further, different catalyst components, for example with a late transition metal catalyst component for olefin polymers by coordination polymerization, more preferably based on groups 8-10 of the Periodic Table of Elements, still more preferably selected from the group comprising, preferably consisting of Fe, Ni, Pd, Co, preferably Fe, preferably having a tridentate ligand bearing at least two ortho, ortho-disubstituted aryl radicals. Preferred iron catalyst components are those described in patent application WO 2005/103100. Alternatively, any one of the first and second catalyst components—either alone or in combination—can be used in combination with a metallocene, for example a hafnocene, for example as those described in WO2005/103100, or a zirconocene, for example as those described in WO2006/114210. In any one of these catalyst systems, in order to adjust the molecular weight of the polyethylene, it is advantageous to polymerize or copolymerize ethylene with at least one alpha-olefin comonomer by subjecting ethylene and, optionally, the alpha-olefin comonomer, in the presence of the respective catalyst system and of an organometallic compound, preferably comprising aluminum alkyls and/or magnesium alkyls. Still more preferably, these organometallic compounds comprise aluminum alkyls, preferably trialkylaluminum compounds. Preferably, these aluminum alkyls comprise, for example, trimethylaluminum (TMA), triethylaluminum (TEA), tri-isobutylaluminum (TIBA), and tri-n-hexylaluminum (TNHA), isoprenylaluminum (IPRA) and the like.

DETAILED DESCRIPTION OF THE PREFERRED EMBODIMENTS

The present invention will be further described by means of the following preferred embodiments without restricting the scope of the invention.

Density is the polymer density a determined in accordance with standard DIN EN ISO 1183-1:2004, method A (immersion).

The melt flow rate MFR (190/2.16) was determined according to DIN EN ISO 1133:2005, condition D at a temperature of 190° C. under a load of 2.16 kg.

The melt flow rate MFR (190/5) was determined according to DIN EN ISO 1133:2005, condition T at a temperature of 190° C. under a load of 5 kg.

The melt flow rate MFR (190/21.6) was determined according to DIN EN ISO 1133:2005, condition G at a temperature of 190° C. under a load of 21.6 kg.

$M_w$ is the weight average molar mass (weight average molecular weight) and $M_n$ is the number average molar mass (number average molecular weight). The determination of the molar mass $M_n$, $M_w$ was carried out by high-temperature gel permeation chromatography using a method described in DIN 55672-1:1995-02 issue February 1995. The deviations according to the mentioned DIN standard are as follows: Solvent 1,2,4-trichlorobenzene (TCB), temperature of apparatus and solutions 135° C. and as concentration detector a PolymerChar (Valencia, Paterna 46980, Spain) IR-4 infrared detector, capable for use with TCB. A WATERS Alliance 2000 equipped with the following precolumn SHODEX UT-G and separation columns SHODEX UT 806 M (3×) and SHODEX UT 807 connected in series was used. The solvent was vacuum distilled under nitrogen and was stabilized with 0.025% by weight of 2,6-di-tert-butyl-4-methylphenol. The flow rate used was 1 ml/min, the injection was 500 µl and polymer concentration was in the range of 0.01%<conc.<0.05% w/w. The molecular weight calibration was established by using monodisperse polystyrene (PS) standards from Polymer Laboratories (now Varian, Inc., Essex Road, Church Stretton, Shropshire, SY6 6AX,UK) in the range from 580 g/mol up to 11600000 g/mol and additionally Hexadecane. The calibration curve was then adapted to Polyethylene (PE) by means of the Universal Calibration method (Benoit H., Rempp P. and Grubisic Z., & in J. Polymer Sci., Phys. Ed., 5, 753 (1967)). The Mark-Houwing parameters used herefore were for PS: $k_{PS}$=0.000121 dl/g, $\alpha_{PS}$=0.706 and for PE $k_{PE}$=0.000406 dl/g, $\alpha_{PE}$=0.725, valid in TCB at 135° C. Data recording, calibration and calculation was carried out using NTGPC_Control_V6.02.03 and NTG-PC_V6.4.24 (hs GmbH, Hauptstraβe 36, D-55437 Ober-Hilbersheim) respectively.

I.V. is the intrinsic viscosity as determined according to ISO 1628-1.

The glass transition temperature (Tg) was determined by Dynamic Mechanical Thermal Analysis (DMTA) in accordance with DIN EN ISO 6721-2, 1996. The material taken from polymerization was pressed in a sheet of 70 mm×40 mm×1 mm under 20-30 bar pressure during melting until reaching a stable temperature of 200° C. for 1 min. After this temperature is reached, the material was pressed for 4 min under 100 bar and afterwards cooled with 15 K/min. After cooling, test specimens of dimensions 12.5 mm×40 mm×1 mm were stamped from the sheet. In an oscillation measurement in torsion mode with 1 Hz excitation frequency and a strain amplitude lower than 0.04%, a temperature range of at least −100° C. to +110° C. is covered, using a heating rate of 1K /min. Tg is determined from the maximum of the loss modulus G" peak.

The melting enthalpies of the polymers (ΔHf) were measured by Differential Scanning calorimetry (DSC) on a heat flow DSC (TA-Instruments Q2000), according to the standard method (ISO 11357-3 (1999)). The sample holder, an aluminum pan, is loaded with 5 to 6 mg of the specimen and sealed. The sample is then heated from ambient temperature to 200° C. with a heating rate of 20 K/min (first heating). After a holding time of 5 minutes at 200° C., which allows complete melting of the crystallites, the sample is cooled to −10° C. with a cooling rate of 20 K/min and held there for 2 minutes. Finally the sample is heated from −10° C. to 200° C. with a heating rate of 20 K/min (second heating). After construction of a baseline the area under the peak of the second heating run is measured and the enthalpy of fusion ($\Delta H_f$) in J/g is calculated according to the corresponding ISO (11357-3 (1999)).

EXAMPLE 1

Preparation of the Catalyst System

Preparation of Catalyst System 1) (Invention)

24.9 mg of eta-5-2-((2-(trimethylsilyl)-1H-inden-1-yl)methyl)pyridine have been dissolved in 3.8 ml MAO (30 wt % in toluene, from Albemarle) and 20 ml toluene in argon atmosphere. Separately 44.9 mg of eta-5-(3-phenyl-1-(2-(pyridin-2-yl)propan-2-yl)cyclopenta-2,4-dienyl)chromium(IV) chloride have been dissolved in 7.4 ml MAO (30% wt in toluene, from Albemarle) and 20 ml toluene, also in argon atmosphere. Then 6 ml of the first solution and 3.5 ml of the second solution were mixed together to form the catalyst system.

Preparation of Catalyst System 2) (Invention)

51.7 mg of eta-5-2-((2-(trimethylsilyl)-1H-inden-1-yl)methyl)pyridine in 7.9 ml MAO have been dissolved in 7.9 ml MAO (30 wt % in toluene, from Albemarle) and 20 ml toluene in argon atmosphere. Separately 47.3 mg of eta5-(2-methyl-3-(4-trifluoromethyl)phenyl-1-(8-quinolyl))cyclopentadienyl chromium dichloride have been dissolved in 6.3 ml MAO (30 wt % in toluene, from Albemarle) and 20 ml toluene, also in argon atmosphere. Then 3.3 ml of the first solution and 4 ml of the second solution were mixed together to form the catalyst system.

Preparation of Catalyst System 3) (Prior Art)

Catalyst system 3) was prepared by dissolving 17.3 mg eta5-(2-methyl-3-(4-trifluoromethyl)phenyl-1-(8-quinolyl)) cyclopentadienyl chromium dichloride in 20 ml toluene and 2,3 ml MAO (30% wt in toluene, Albemarle).

Preparation of Catalyst System 4) (Prior Art)

Catalyst system 4) was prepared by dissolving 24.1 mg eta-5-(3-phenyl-1-(2-(pyridin-2-yl)propan-2-yl)cyclopenta-2,4-dienyl)chromium(IV) in 10 ml toluene and 8.1 ml MAO (30% wt in toluene, from Albemarle).

The catalyst systems are shown in the following Table 1.

TABLE 1

| Catalyst system | Cr complex 1 | Cr complex 2 | Cocatalyst | Cr complex 1/ Cr complex 2 (mol/mol) | Al/Cr (mol/mol) |
|---|---|---|---|---|---|
| 1) | a1) | a2) | MAO | 1/1 | 300 |
| 2) | b1) | a2) | MAO | 1/1 | 300 |
| 3) | b1) | — | MAO | 1/0 | 300 |
| 4) | a1) | — | MAO | 1/0 | 300 | where
a1) is eta-5-(3-phenyl-1-(2-(pyridin-2-yl)propan-2-yl)cyclopenta-2,4-dienyl)chromium (IV) chloride:

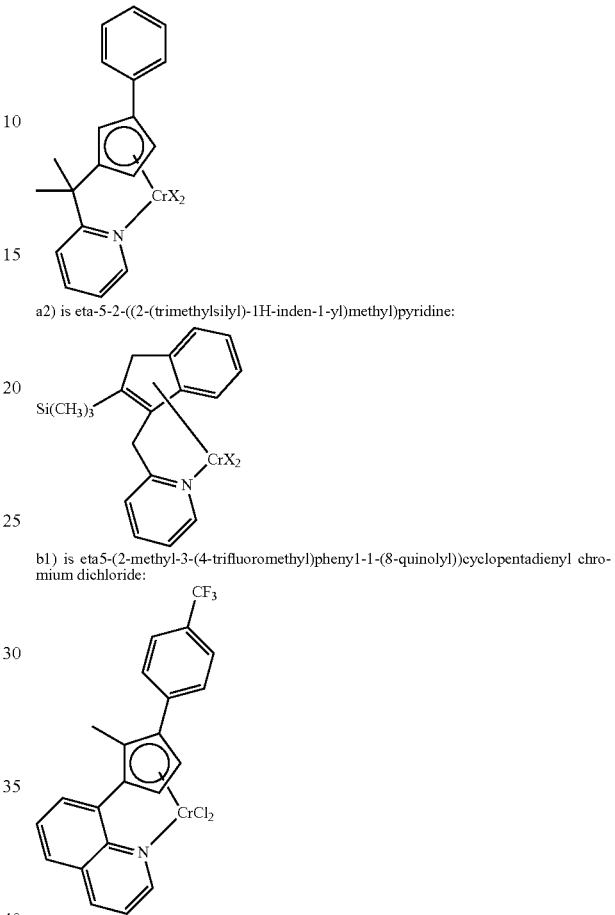

a2) is eta-5-2-((2-(trimethylsilyl)-1H-inden-1-yl)methyl)pyridine:

b1) is eta5-(2-methyl-3-(4-trifluoromethyl)phenyl-1-(8-quinolyl))cyclopentadienyl chromium dichloride:

EXAMPLE 2

Polymerization and Polymer Properties

Polymers have been synthesized in 1 l Buchi steel autoclave, in 1-hexene solution at 150 mg partial pressure of ethylene of 10 bar and temperature of 90° C. 1-hexene 0.6 l was charged into the autoclave, the temperature was raised to 90° C. while raising the ethylene pressure. The final ethylene pressure was of 10 bar. TIBA (3 ml solution 50mg/ml) was added as scavenger. Afterwards the respective catalyst system was injected and ethlylene automatically supplied by a flow meter driven by the reactor pressure. The pressure was kept constant during the polymerization. The polymerization was terminated after 60 min by adding 5 ml isopropanol. Ethylene has been then released and the polymer still in a homogeneous solution let out the reactor and stabilized by Irganox 1010. The polymer solution has been then precipitated in methanol and the polymer dried in a vacuum oven at 80° C. till constant weight.

Four polymerizations have been carried out in said conditions, for each of the catalyst systems 1)-4) (in each case containing 30 μmol of total Cr, producing the four polymers reported in Table 2.

TABLE 2

| Polymer | Catalyst system | Hexene [w %] | Density [g/cm³] | I.V. [dl/g] | Mw [g/mol] | Mn [g/mol] | Mw/Mn | MFR (190/2.16) [g/10 min] |
|---|---|---|---|---|---|---|---|---|
| 1 | 1) | 21 | 0.874 | 0.74 | 34017 | 13808 | 2.5 | 17.5 |
| 2 | 2) | 21 | 0.878 | 0.83 | 53692 | 20392 | 2.6 | 13.5 |
| 3 | 3) | 27 | 0.862 | 1.19 | 34252 | 71471 | 2.1 | 11.5 |
| 4 | 4) | 20 | 0.881 | 1.34 | 63989 | 25576 | 2.5 | 4.1 |

Further properties, in particular glass transition temperature Tg, melting enthalpy ΔHf, first and second CRYSTAF peak temperatures T1 and T2, of polymers 1-4 are reported in Table 3.

TABLE 3

| Polymer | Catalyst system | Tg [° C.] | ΔHf [J/g] | T1[° C.] | T2[° C.] |
|---|---|---|---|---|---|
| 1 | 1) | −47.0 | 23.4 | 6.2 | 66.0 |
| 2 | 2) | −43.5 | 28.8 | 11.4 | 65.5 |
| 3 | 3) | −46 | 14.9 | 3 | — |
| 4 | 4) | −38 | 50.7 | 22 | — |

The invention claimed is:

1. A copolymer of ethylene with at least one alpha-olefin comonomer comprising:

at least one first ethylene polymer and at least one second ethylene polymer having different comonomer contents such that the copolymer shows at least two CRYSTAF peak temperatures, wherein the at least two CRYSTAF peak temperatures comprise a first CRYSTAF peak temperature lower than 30° C. and a second CRYSTAF peak temperature at least 20° C. higher than the first peak temperature and higher than 50° C.; and, wherein the copolymer has:

(i) a density from 0.855 g/cm³ to 0.910 g/cm³, (ii) a polydispersity $M_w/M_n$ lower than 3.5.

2. The copolymer according to claim 1, having a polydispersity $M_w/M_n$ from 2 to 3.

3. The copolymer according to claim 1, wherein the first CRYSTAF peak temperature is in the range from 0° C. to 30° C.

4. A composition comprising an ethylene copolymer according to claim 1 and an ethylene homopolymer.

5. A composition comprising an ethylene copolymer according to claim 1 and a polymer blend.

* * * * *